Patented Feb. 15, 1927.

1,617,726

UNITED STATES PATENT OFFICE.

FRANK N. SPELLER, OF PITTSBURGH, PENNSYLVANIA.

MANUFACTURE OF STEEL.

No Drawing. Continuation of application Serial No. 53,083, filed August 25, 1925. This application filed August 16, 1926. Serial No. 129,663.

This invention is a continuation of the invention described and claimed in my copending application Serial No. 53,083, filed August 25, 1925, and relates to the manufacture of steel, and more particularly to a novel method of manufacturing steel whereby the time of holding dead metal in the ladle may be prolonged.

The object of the present invention is to add sufficient additional heat to warm the bottom of the ladle to make up for radiation losses, whereby the heat of steel may be safely held in the teeming ladle for several minutes longer than usual, according to the quantity of heat imparted to the ladle prior to pouring the metal.

In carrying out my improved method in the manufacture of Bessemer steel, the steel will be blown according to the ordinary and well known method. Then before the steel is poured from the converter into the ladle, the ladle will be charged with a quantity of superheated steel or with a mixture of ferromanganese diluted with two or more times its own weight of superheated steel. A quantity of this steel or mixture of manganese and steel sufficient to supply enough heat to warm the bottom of the ladle and make up for radiation losses is first put into the teeming ladle, so that the heat of steel can be held safely in the ladle for from seven to eight minutes or even longer, the time varying with the original temperature of the ladle and other conditions.

When desired, spiegel, ferro-silicon, aluminum or other deoxidizers may be mixed with the superheated steel instead of the ferro-manganese. When manganese or other metals are mixed with the superheated steel, they serve to deoxidize the metal, and when manganese is used it also combines with Bessemer steel to form the desired manganese content.

In order to make up and maintain a supply of the superheated steel or mixture of ferro-manganese, or other deoxidizers, and superheated Bessemer steel, a furnace, preferably an electric furnace, will be employed, it being arranged so that a portion of each Bessemer heat can be added to the superheated metal in the furnace before or after teeming. The added amounts of ferro-manganese or other deoxidizers, when used, will be added cold to the furnace, thus avoiding the necessity of melting cold steel, and providing a constant supply of the superheated metal.

When using the method in the manufacture of open-hearth steel, in order to permit the open-hearth steel to be held in the pouring ladles for a greater time without the formation of skulls, substantially the same steps as described above will be followed, except that the superheated mixture preferably will be made up from a quantity of the open-hearth steel, or a mixture of a deoxidizing metal and open-hearth steel. The open-hearth steel would be manufactured in the usual manner and then tapped into ladles containing a quantity of the superheated steel or steel mixture.

This novel method is particularly adapted to the manufacture of Bessemer steel, since it is well known that the finishing of Bessemer steel must all be done in the ladle. Nothing is gained by holding the steel in the converter after blowing. Therefore, Bessemer steel generally carries considerably more entrained oxids and other non-metallic inclusions than open-hearth steel, which is the main reason for the larger percentage of laminations found in this material. By practicing the novel method of this invention the steel may be held in the ladle longer, the quantity of non-metallic inclusions may be materially reduced and the quality of the steel correspondingly improved.

Various changes in my improved method may be made without departing from the invention as defined in the appended claims.

I claim:

1. In the manufacture of steel, the step consisting of preheating the ladle by charging a quantity of superheated steel into the ladle, prior to pouring the heat of steel into the ladle.

2. In the manufacture of steel, the step consisting of preheating the ladle by charging a mixture of a deoxidizing metal diluted with more than two parts by weight of steel superheated above the melting point into the ladle, prior to pouring the heat of steel into the ladle.

3. In the manufacture of steel, the step consisting of preheating the ladle by charging a quantity of superheated steel into the ladle prior to pouring the heat of steel into the ladle, whereby radiation losses are offset and the steel may be held in the ladle for a considerable length of time to permit complete reactions and separation of the non-metallic inclusions.

4. In the manufacture of Bessemer steel, the step consisting of preheating the ladle by charging thereinto a fluid mixture of ferro-manganese diluted with more than two parts by weight of steel superheated above the melting point, prior to pouring the heat of blown steel into the ladle.

5. In the manufacture of Bessemer steel, the steps consisting in making a bath composed of one part ferro-manganese and more than two parts by weight of Bessemer steel in a suitable furnace, superheating this bath to a point materially above the melting point of the steel, maintaining the bath by additions of steel from each Bessemer heat, and utilizing this bath for preheating the ladles and deoxidizing the Bessemer heats by charging a quantity of the bath into the ladles prior to pouring the heats of Bessemer steel.

6. In the manufacture of steel, the step consisting of preheating the ladle by charging a fluid mixture of ferro-manganese diluted with a quantity of superheated steel, prior to pouring the heat of steel into the ladle, whereby radiation losses are offset and the steel may be held in the ladle for a considerable length of time to permit complete reactions and separation of the non-metallic inclusions.

In testimony whereof, I have hereunto signed my name.

FRANK N. SPELLER.